United States Patent
Blanquart

(10) Patent No.: US 8,164,657 B2
(45) Date of Patent: Apr. 24, 2012

(54) PIXEL OR COLUMN FIXED PATTERN NOISE MITIGATION USING PARTIAL OR FULL FRAME CORRECTION WITH UNIFORM FRAME RATES

(75) Inventor: Laurent Blanquart, Westlake Village, CA (US)

(73) Assignee: AltaSens, Inc, Westlake Village, CA (US)

( * ) Notice: Subject to any disclaimer, the term of this patent is extended or adjusted under 35 U.S.C. 154(b) by 726 days.

(21) Appl. No.: 12/163,211

(22) Filed: Jun. 27, 2008

(65) Prior Publication Data
US 2009/0322912 A1 Dec. 31, 2009

(51) Int. Cl.
*H04N 5/217* (2011.01)
*H04N 5/228* (2006.01)
*H04N 5/235* (2006.01)
*H04N 9/64* (2006.01)
*H04N 5/335* (2011.01)

(52) U.S. Cl. .......... 348/241; 348/222.1; 348/229.1; 348/243; 348/246; 348/294; 348/296; 348/302; 348/308

(58) Field of Classification Search .......... 348/243, 348/297, 222.1, 229.1, 241, 246, 294, 296, 348/302, 308; 358/446, 463
See application file for complete search history.

(56) References Cited

U.S. PATENT DOCUMENTS

| | | | |
|---|---|---|---|
| 5,475,425 A * | 12/1995 | Przyborski et al. | 348/239 |
| 6,061,092 A * | 5/2000 | Bakhle et al. | 348/243 |
| 6,563,536 B1 * | 5/2003 | Rashkovskiy et al. | 348/243 |
| 6,965,410 B1 * | 11/2005 | Yamagishi | 348/362 |
| 2002/0051229 A1 * | 5/2002 | Eguchi et al. | 358/445 |
| 2002/0101532 A1 * | 8/2002 | Takayama et al. | 348/362 |
| 2002/0176013 A1 * | 11/2002 | Itoh | 348/243 |
| 2002/0196348 A1 * | 12/2002 | Kubo | 348/220.1 |
| 2003/0184661 A1 * | 10/2003 | Yubata et al. | 348/229.1 |
| 2004/0135922 A1 * | 7/2004 | Nakajima et al. | 348/362 |
| 2005/0190272 A1 * | 9/2005 | Takahashi et al. | 348/222.1 |
| 2006/0256215 A1 * | 11/2006 | Zhang et al. | 348/243 |
| 2009/0322911 A1 * | 12/2009 | Blanquart | 348/241 |

* cited by examiner

*Primary Examiner* — Jason Chan
*Assistant Examiner* — Michael Osinski
(74) *Attorney, Agent, or Firm* — Turocy & Watson, LLP

(57) ABSTRACT

Systems and methods are provided that facilitate mitigating pixel or column fixed pattern noise in a CMOS imaging System-on-Chip (iSoC) sensor. For instance, pixel or column fixed pattern noise can be recognized by gating a pixel array without firing a transfer signal (TX). Inhibiting the transfer signal can cause zero input to be provided to pixels in the pixel array; thus, the sampled output from the pixels under such conditions can be a function of noise. Calibration and correction can thereafter be effectuated. Moreover, uniform frame rates for outputted frames can be yielded irrespective of use of a subset of read out frames for calibration. For example, frames employed for calibration can be replaced in a sequence of outputted frames by copies of stored frames. Further, signal levels can be balanced to account for differences in light integration time, which can result from blocking and unblocking firing of transfer signals.

17 Claims, 11 Drawing Sheets

PIXEL OR COLUMN FIXED PATTERN NOISE MITIGATION USING PARTIAL OR FULL FRAME CORRECTION WITH UNIFORM FRAME RATES

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, . . . ) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined charge level prior to charge transference.

CMOS imaging sensors can exhibit fixed pattern noise. Pixels within the array can yield signals associated with differing intensities relative to general background noise. Further, the fixed pattern noise can cause each pixel in the array to present a similar noise pattern in images captured over time while under similar conditions (e.g., temperature, exposure, . . . ); for instance, a pixel with high intensity due to the fixed pattern noise captured in an image at a first time can exhibit similar high intensity due to the fixed pattern noise at a second time. Inclusion of the fixed pattern noise can therefore distort images yielded by CMOS imaging sensors. Conventional techniques mitigate fixed pattern noise on a column by column basis (e.g., reduce column fixed pattern noise); however, such techniques can yield images that continue to be degraded by the effects of pixel fixed pattern noise. Moreover, other common techniques involve calibrating for fixed pattern noise by positioning a cap over a lens to block incident light to yield references (e.g., user placing the cap over the lens before operation); yet, these techniques oftentimes fail to account for changes in fixed pattern noise over time during operation (e.g., due to changes in temperature, gain, . . . ).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate mitigating pixel or column fixed pattern noise in a CMOS imaging System-on-Chip (iSoC) sensor. For instance, pixel or column fixed pattern noise can be recognized by gating a pixel array without firing a transfer signal (TX). Inhibiting the transfer signal can cause zero input to be provided to pixels in the pixel array; thus, the sampled output from the pixels under such conditions can be a function of noise. Calibration and correction can thereafter be effectuated. Moreover, uniform frame rates for outputted frames can be yielded irrespective of use of a subset of read out frames for calibration. For example, frames employed for calibration can be replaced in a sequence of outputted frames by copies of stored frames. Further, signal levels can be balanced to account for differences in light integration time, which can result from blocking and unblocking firing of transfer signals.

According to various aspects, a transfer signal inhibition component can transmit a first command to block firing of transfer signals to gates of transfer transistors of pixels in a pixel array while sampling signals in the pixel array. Further, a frame duplication component can replicate a data frame obtained prior to transmission of the first command to block firing of the transfer signals and replace a calibration frame received subsequent to transmission of the first command in an outputted sequence of frames. Moreover, a calibration component can determine fixed pattern noise values associated with the pixels based at least in part upon digital signals associated with the calibration frame. Pursuant to another example, a gain control component can balance signal levels corresponding to each frame as a function of light integration time by utilizing digital gain. The light integration time can vary based upon whether the transfer signals are blocked or unblocked.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
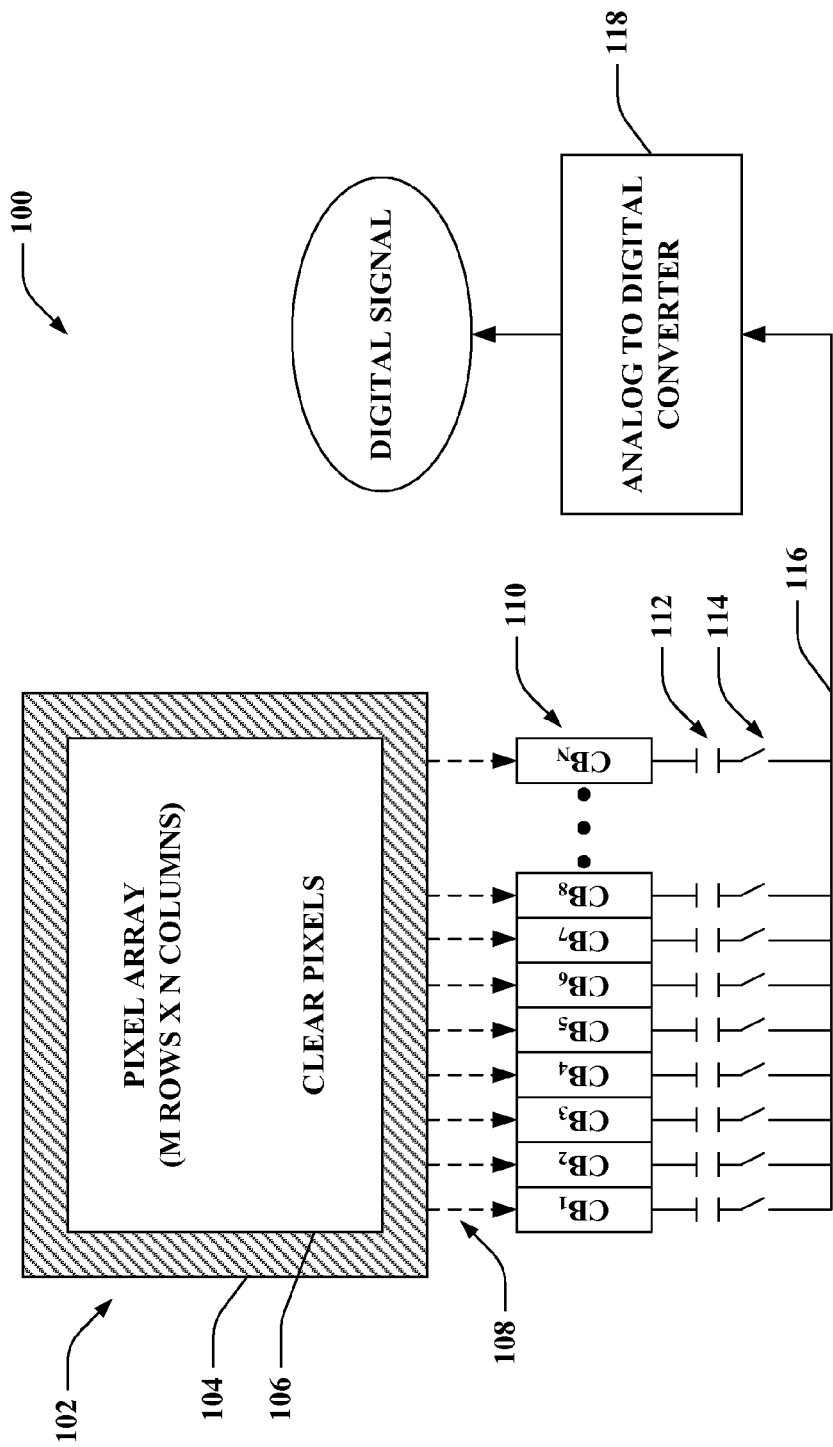
FIG. 1 illustrates a block diagram of an example system that generates digital signals by employing a CMOS sensor imager.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that generates digital signals by employing a CMOS sensor imager. The system 100 can be associated with a CMOS sensor imager utilized in connection with a camcorder, digital camera, microscope, video system, and/or the like. The system 100 comprises a pixel array 102 that can include M rows and N columns of pixel cells, where M and N can be any integers. Each pixel in the pixel array 102 can comprise a photodetector (e.g., photogate, photoconductor, photodiode, . . . ). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels).

The pixel array 102 can include a portion 104 covered by metal. The metal covered portion 104 can include optical black pixels; thus, pixels included in the portion 104 lack exposure to light due to being covered by metal. Any number of rows (out of the M rows) and/or columns (out of the N columns) can be included in the metal covered portion 104 of the pixel array 102. The pixel array 102 can additionally include a clear pixel portion 106. Pixels in the clear pixel portion 106 can be exposed to light. It is to be appreciated that any number of rows and/or columns can be included in the clear pixel portion 106. Moreover, the metal covered portion 104 can, but need not, be symmetrically located upon the pixel array 102 with respect to the clear pixel portion 106; for instance, a first number of rows can be covered by metal at a top of the pixel array 102 and a second number of rows can be covered by metal at a bottom of the pixel array 102 such that the first and second numbers can be the same or different.

An image focused on the pixel array 102 (e.g., the clear pixel portion 106) can cause the pixels to convert incident light into electrical energy. Signals obtained by the pixel array 102 can be processed on a column by column basis; thus, a particular row of pixels from the pixel array 102 can be selected to be read. The system 100 can further include a plurality of read buses 108 that can transfer the contents from the pixels in the pixel array 102 in the selected row. According to an illustration, the system 100 can include N read buses 108, where each read bus 108 can be associated with a respective column of the pixel array 102. By way of further example, pixels in the pixel array 102 can share read buses 108, and thus, the system 100 can include fewer than N read buses 108.

Each read bus 108 can carry content (e.g., sampled signals) from the pixels to a respective column buffer (CB) 110. The system 100 can include N column buffers 110 or fewer, for instance. The column buffers 110 can amplify (e.g., condition) the signals from the pixels. Further, each column buffer 110 can enable low noise readout and can condition the signal from a pixel positioned at one of the rows in the column (or columns) corresponding to the column buffer 110.

After processing by the column buffers 110, outputted values from each of the column buffers 110 can be retained. Moreover, each of the column buffers 110 can be associated with respective circuitry such as, for instance, a respective capacitor 112 and switch 114. Such circuitry can sample and hold outputted values from the corresponding column buffers 110. For example, the capacitors 112 can be loaded with the outputted values from the corresponding column buffers 110. Further, the switches 114 can be closed one at a time to allow for connecting to a bus 116; thus, the voltages generated by the column buffers 110 can be multiplexed over the bus 116. The bus 116 can enable communicating each of the outputted values from the respective column buffers 110 to an analog to digital converter (ADC) 118. The ADC 118 can digitize the sampled signal to yield a digital signal. The digital signal can thereafter be provided to disparate component(s) (not shown) for further processing, manipulation, storage, and so forth.

Images yielded from the digital signal can be deleteriously impacted by fixed pattern noise (FPN). Fixed pattern noise can be introduced into the signal based upon processing effectuated within the system 100 (e.g., by the pixels of the pixel array 102, column buffers 110, ADC 118, . . . ). For example, different pixels can yield disparate, respective fixed pattern noise, differing column buffers 110 can generate differing, respective fixed pattern noise, and so forth (e.g., due to mismatch between the pixels, column buffers 110, . . . ). Accordingly, calibration techniques can be employed to mitigate the fixed pattern noise.

The optical black pixels in the metal covered portion 104 of the pixel array 102 can be employed for calibration by providing references from which noise levels can be deduced. By way of illustration, a row of optical black pixels in the metal covered portion 104 can be selected to be read. Since this row of optical black pixels fail to receive light, signals yielded by each of these pixels lack correlation to incident light upon the pixel array 102 (e.g., zero input is provided to the optical black pixels). The signals generated by the optical black pixels can be processed in a similar manner as compared to pixels from the clear pixel portion 106 of the pixel array 102 (e.g., pixels in the same column can be read through the same column buffer 110). Since zero input is provided to the optical black pixels, it can be expected that zero output should be yielded upon processing; however, noise can be included in the outputted signals. Accordingly, calibration can be effectuated to determine the noise associated with each column, which can be referred to as the column fixed pattern noise (column FPN). Noise values associated with each column of the pixel array 102 can be determined during calibration; for instance, digital signals corresponding to the row of optical black pixels can be retained in a line of memory, where each of the digital signals can correlate to noise of a particular column. Thereafter, the set of noise values from the line of memory can be utilized during a correction phase to mitigate column FPN within the outputted digital signal (e.g., subtract a noise value associated with a particular column from a signal value of a clear pixel from the particular column). It is contemplated that digital signals from any number of rows of optical black pixels can be combined in any manner. For example, various calibration algorithms can be utilized by the system 100 (e.g., determining average, median, mode, etc. of digital signals from optical black pixels in each column over time, aging out older values of digital signals from optical black pixels, . . . ).

The system 100 can additionally mitigate pixel fixed pattern noise. In comparison, conventional techniques typically are unable to adequately reduce pixel fixed pattern noise. The system 100 can mitigate such noise by averaging the noise over a number of samples yielded from zero input to pixels, which provide noise only as outputted signals. For instance, a sigma value of column fixed pattern noise (e.g., peak to peak of the distribution of the FPN) can be a function of a sigma value of random noise. By way of illustration, $$\sigma_{columnFPN} = \frac{1}{\sqrt{number\_of\_lines\_averaged}} \sigma_{random\_noise}.$$

The number of lines averaged can be the number of lines with zero input and noise as output. For instance, if 100 lines are averaged, then the sigma of the FPN can be 1/10 of the sigma of the random noise. However, common techniques oftentimes can be limited by the number of lines able to be averaged (e.g., the metal covered portion 104 can include 10-15 rows of optical black pixels for averaging), which can lead to an inability to sufficiently mitigate the fixed pattern noise (e.g., vertical stripes can be seen) from the digital signal yielded from the pixel array 102. Even though common techniques repeatedly run over the same 10-15 rows in video mode (to reach more than 100 samples in the above example), the pixel FPN associated with the 10-15 rows limits the minimum achievable $\sigma_{columnFPN}$. This can be particularly problematic in low light level scenarios. When exposed to a high level of light, the content can be bright; further, when the content is bright, noise in the digital signal can be less noticeable due to the large signal level (even though the noise level can increase in high light level scenarios). In contrast, while in low light levels, the noise level can be very high in comparison to the signal level, and the noise (as well as the signal) can be amplified by utilizing large gains under such conditions.

By way of illustration, the system 100 can mitigate pixel or column fixed pattern noise by gating the pixel array 102 without firing a transfer signal (TX). Inhibiting the transfer signal can cause zero input to be provided to the clear pixels in the portion 106; therefore, the output provided from the clear pixels when zero input is provided can be the noise (e.g., substantially similar to the optical black pixels of the metal covered portion 104). Thus, an entire black frame can be utilized for calibrating for the pixel or column fixed pattern noise rather than employing only the optical black pixels included in the metal covered portion 104. Additionally or alternatively, the system 100 can generate entire black frame(s) for calibration while maintaining a constant frame rate. Thus, for example, one or more frames can be utilized as references to deduce pixel or column fixed pattern noise during calibration (e.g., under low light conditions) while a consistent frame rate can be outputted. Calibration can use, for example, a frame of memory (internal and/or external) that mitigates pixel fixed pattern noise or a line of memory (internal and/or external) that mitigates column fixed pattern noise. Thereafter, the outputted frames can be displayed, retained in memory, analyzed, transferred (e.g., for display, storage, evaluation, etc. by a disparate device, . . . ), and so forth.

Figure 2:
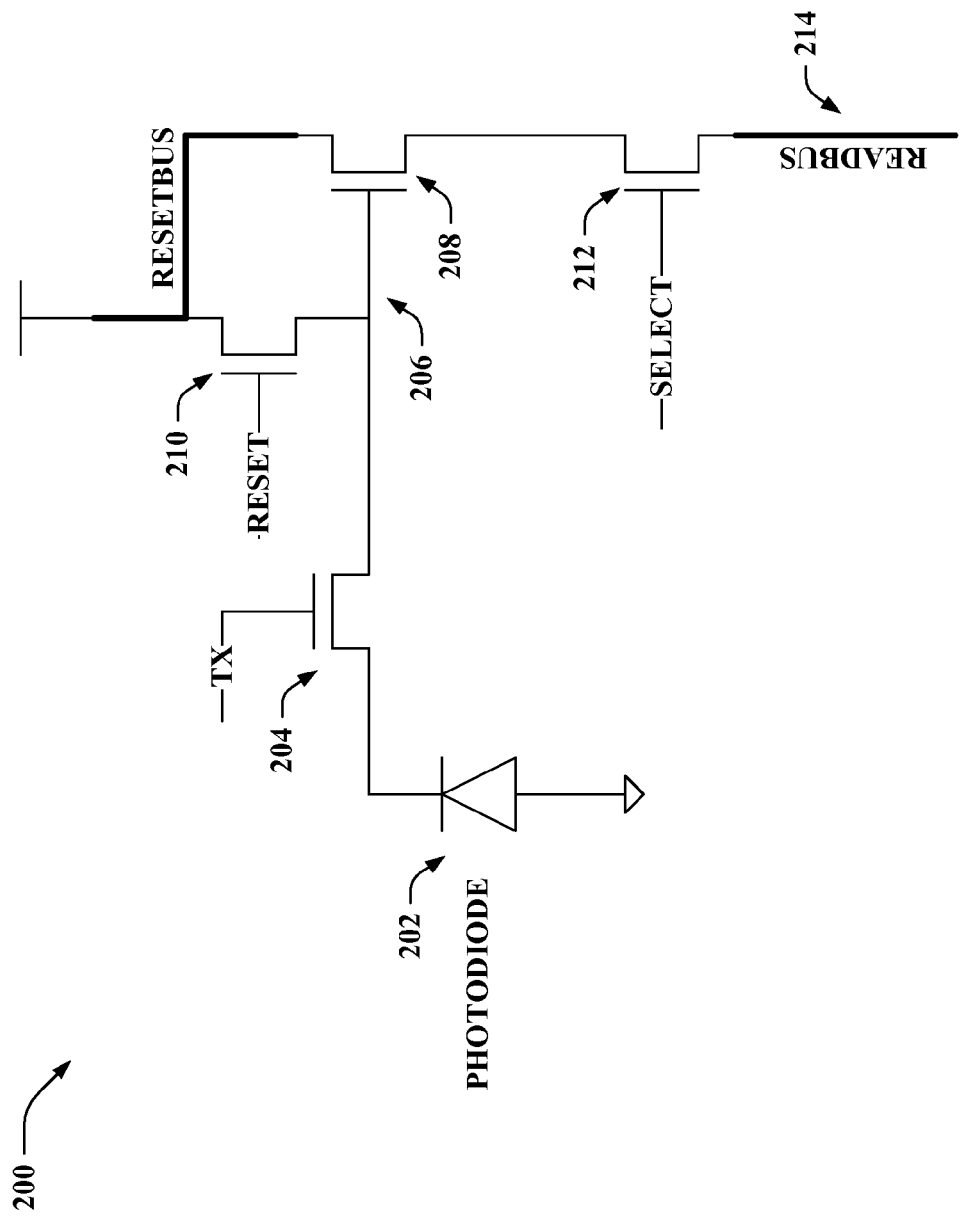
FIG. 2 illustrates an example CMOS imager pixel cell 200 that can be included in a pixel array.

Now turning to FIG. 2, illustrated is an example CMOS imager pixel cell 200 that can be included in a pixel array (e.g., the pixel array 102 of FIG. 1). The pixel cell 200 includes a photodiode 202 connected to a transfer transistor 204. The transfer transistor 204 is further connected to a floating diffusion region 206. The floating diffusion region 206 connects to a source follower transistor 208 and a reset transistor 210. The source follower transistor 208 is further connected to a select transistor 212. The select transistor 212 can be employed to select a particular row of pixel cells from a pixel array.

The photodiode 202 can be charged by converting optical energy to electrical energy. For instance, the photodiode 202 can have sensitivity to a particular type of incident light (e.g., red light, blue light, green light). Moreover, the type of light to which the photodiode 202 is sensitive can indicate a type of the pixel cell 200 (e.g., R pixel, B pixel, G pixel).

According to an illustration, the floating diffusion region 206 can be reset to a known state before transfer of charge to it. Resetting of the floating diffusion region 206 can be effectuated by the reset transistor 210. Further, the transfer transistor 204 can transfer charge (e.g., yielded by the photodiode 202) to the floating diffusion region 206. The charge can be transferred based upon a transfer signal (TX) received at a gate of the transfer transistor 204. Moreover, the pixel cell 200 (along with other pixel cell(s) in the same row of the pixel array) can be selected for readout by employing the select transistor 212. Readout can be effectuated via a read bus 214 (e.g., one of the read buses 108 of FIG. 1). Further, the source follower transistor 208 can output and/or amplify a signal representing a reset voltage (e.g., provided via a reset bus) and a pixel signal voltage based on the photo converted charges.

Light can be integrated at the photodiode 202 and electrons generated from the light can be transferred to the floating diffusion region 206 (e.g., in a noiseless or substantially noiseless manner) when the TX is received at the transfer transistor 204. Thus, until reception of the TX, the light can be integrated; hence, if the TX is blocked, delayed, etc., the amount of data obtained by the photodiode 202 can increase (in comparison to when a TX that is unblocked, non-delayed, etc.). Accordingly, increasing a length of time for light integration can yield a brighter signal. By way of illustration, a subset of the TXs in a series can be blocked in low light to enable providing stronger signals for readout associated with the remaining TXs that are fired.

Further, if the TX is not fired (e.g., after reset), then the electrons are not transferred from the photodiode 202 to the floating diffusion region 206. Hence, this scenario can be substantially similar to obtaining zero input where no incident light is obtained by the photodiode 202 (e.g., substantially similar to an optical black pixel). If selected for readout, the pixel cell 200 under such conditions (e.g., lack of TX being received at the gate of the transfer transistor 204) can be employed for calibration since noise can be yielded in the absence an expected output signal (e.g., zero output signal plus noise can be generated based upon zero input signal).

Figure 3:
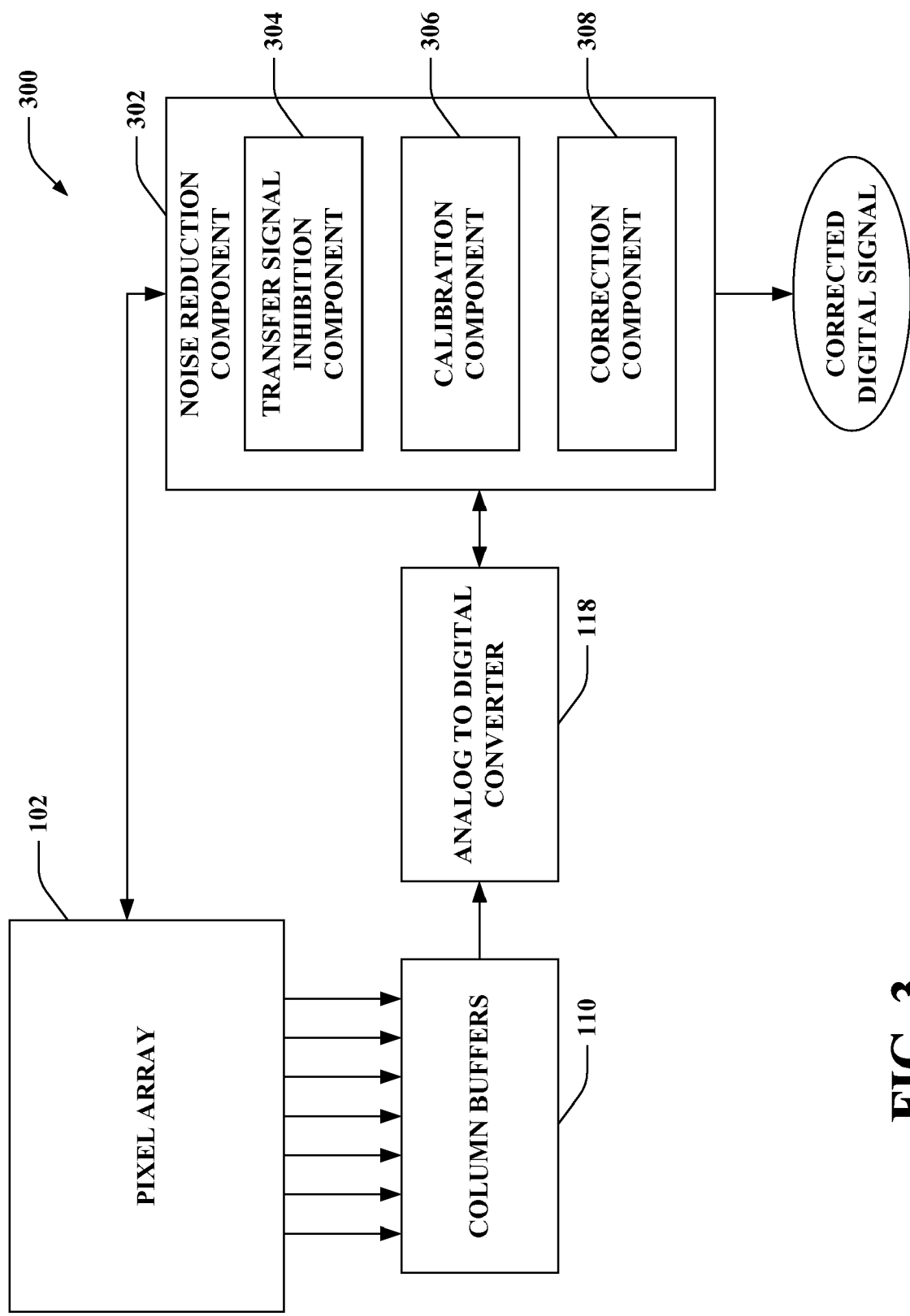
FIG. 3 illustrates an example system that enables calibrating a CMOS sensor imager to mitigate pixel fixed pattern noise.

Now referring to FIG. 3, illustrated is a system 300 that enables calibrating a CMOS sensor imager to mitigate pixel or column fixed pattern noise. The system 300 includes the pixel array 102 that comprises any number of rows and/or columns of pixels. Signals yielded by pixels in the pixel array 102 can be transferred to the column buffers 110 for conditioning, amplifying, etc. Moreover, the digital to analog converter 118 can digitize the output from the column buffers 110 to yield a digital signal.

The system 300 can further include a noise reduction component 302 that can calibrate for and/or correct pixel or column fixed pattern noise. The noise reduction component 302 can obtain digital signals from the ADC 118. A subset of the received digital signals can be utilized for calibration, while a disparate subset (e.g., remainder) of the digital signals can be corrected based upon the calibration to mitigate pixel or column fixed pattern noise associated therewith (e.g., yielding corrected digital signal(s)). Further, the noise reduction component 302 can control operation associated with the pixel array 102; based upon such control, the noise reduction component 302 can determine whether to analyze a received digital signal for calibration and/or correct the received digital signal. Further, the noise reduction component 302 can duplicate received digital signals to maintain outputting corrected digital signals with consistent frame rates. Although not shown, it is contemplated that the noise reduction component 302 can receive analog signals (e.g., from the column buffers 110, carried by the bus 116 of FIG. 1, . . . ) in addition to or instead of the digital signals from the ADC 118.

The noise reduction component 302 can further include a transfer signal inhibition component 304, a calibration component 306, and a correction component 308. The transfer signal inhibition component 304 can enable the pixel array 102 to be gated without firing the transfer signal (TX) in a camera, video system, etc. with a frame of memory. Lack of firing of the transfer signal can enable clear pixels of the pixel array 102 to provide a substantially similar response as compared to the optical black pixels of the pixel array 102. Accordingly, the transfer signal inhibition component 304 can allow for correcting pixel fixed pattern noise for the entire pixel array 102 as opposed to column fixed pattern noise.

The transfer signal inhibition component 304 can send a command (e.g., serial peripheral interface (SPI) command) to a generator (not shown) associated with the pixel array 102 to block the transfer signal. The command can be utilized by the generator to change a value of a transfer signal provided to a gate of a transfer transistor of a pixel to zero (or more than one gate of more than one transfer transistor of more than one pixel). Receipt of the zero valued transfer signal can block transfer of charge from a photodiode (e.g., the photodiode 202 of FIG. 2) to a floating diffusion region (e.g., the floating diffusion region 206 of FIG. 2) as described above. Accordingly, pixels can be gated without firing the transfer signal by utilizing this command. However, it is contemplated that the claimed subject matter is not so limited. Moreover, the transfer signal inhibition component 304 can send a command to unblock firing of the transfer signal.

The calibration component 306 can obtain digital signals from the ADC 118 that correspond to optical black pixels and/or clear pixels that lack receipt of transfer signals during a subset of times. By way of illustration, the calibration component 306 can know addresses of a first black pixel and a last black pixel, and these addresses can be employed for identifying when to operate in calibration mode (or correction mode). Further, the calibration component 306 can evaluate these obtained digital signals to converge on noise values associated with the pixels of the pixel array 102 (e.g., pixel fixed pattern noise). For instance, the calibration component 306 can utilize an entire frame of pixels to effectuate noise related calculations (e.g., employing a fixed pattern noise algorithm); thus, rather than being able to perform such calculations by solely using optical black pixels, all pixels in the pixel array 102 can be employed (e.g., optical black pixels and clear pixels). Therefore, a frame (or more than one frame) can be sacrificed to provide a significantly larger number of rows of pixels (e.g., on the order of 1000's rather than 10's) upon which noise calculations can be performed (e.g., since the number of rows of optical black pixels alone can be insufficient for mitigating pixel or column fixed pattern noise). However, duplication of digital signals from a frame prior (e.g., received before in time) to the sacrificed frame can be effectuated. The duplicated frame can replace the sacrificed frame in an outputted sequence of frames; thus, the calibration component 306 can utilize the sacrificed frame to evaluate pixel fixed pattern noise while a consistent, outputted frame rate associated with the corrected digital signals can be yielded. Moreover, the calibration component 306 can recalibrate for noise, which can vary over time as a function of gain, temperature changes, and so forth.

The calibration component 306 can cause the transfer signal inhibition component 304 to send a command that prevents transfer signals from being provided to the pixels in the pixel array 102 while in calibration mode. For instance, the calibration component 306 can select a subset of the pixels of the array 102 or the entire pixel array 102 to be gated without firing transfer signals. Moreover, the calibration component 306 can control an amount of time during which the transfer signal inhibition component 304 halts communication of transfer signals. The calibration component 306 can analyze digital signals obtained from the ADC 118 that correspond to the pixels that lacked receipt of the transfer signals during corresponding times. The digital signals, for example, can be retained in memory (not shown). By way of illustration, the transfer signal inhibition component 304 can halt firing the transfer signal to all pixels in the pixel array 102 during a particular frame; thus, the corresponding digital signals related to each of the pixels can be stored in a frame of memory or each line can be accumulated in a line of memory. Accordingly, the frame of memory can retain noise values corresponding to each pixel in the array 102. Moreover, if more than one frame is obtained for calibration (e.g., via employing the calibration component 306), then the noise values for each pixel can be averaged, aged out, or analyzed in any other manner (e.g., statistically evaluated to decipher mode, median, range, and the like pertaining to noise values for each pixel). It is contemplated that any algorithm can be utilized to map every pixel of the pixel array 102 to the frame of memory.

It is to be appreciated that the calibration component 306 can perform calibration at substantially any time. For instance, the calibration component 306 can periodically effectuate calibration. Moreover, calibration can be initiated by the calibration component 306 in response to an event (e.g., user provided input, monitored condition, . . . ). By way of example, a user can press a button to begin calibration, a sensor (e.g., thermometer, . . . ) can detect a change in temperature which can trigger calibration, and so forth.

Further, the correction component 308 can utilize the calibrated noise values associated with each of the pixels to correct for the pixel fixed pattern noise utilizing substantially any fixed pattern noise algorithm. For instance, the correction component 308 can subtract a noise value (e.g., retained in the frame of memory) determined by the calibration component 306 for a particular pixel from a digital signal obtained from the ADC 118 corresponding to the particular pixel (e.g., when the transfer signal is fired) since the digital signal can include fixed pattern noise associated with the particular pixel. Accordingly, the correction component 308 can yield a corrected digital signal.

Figure 4:
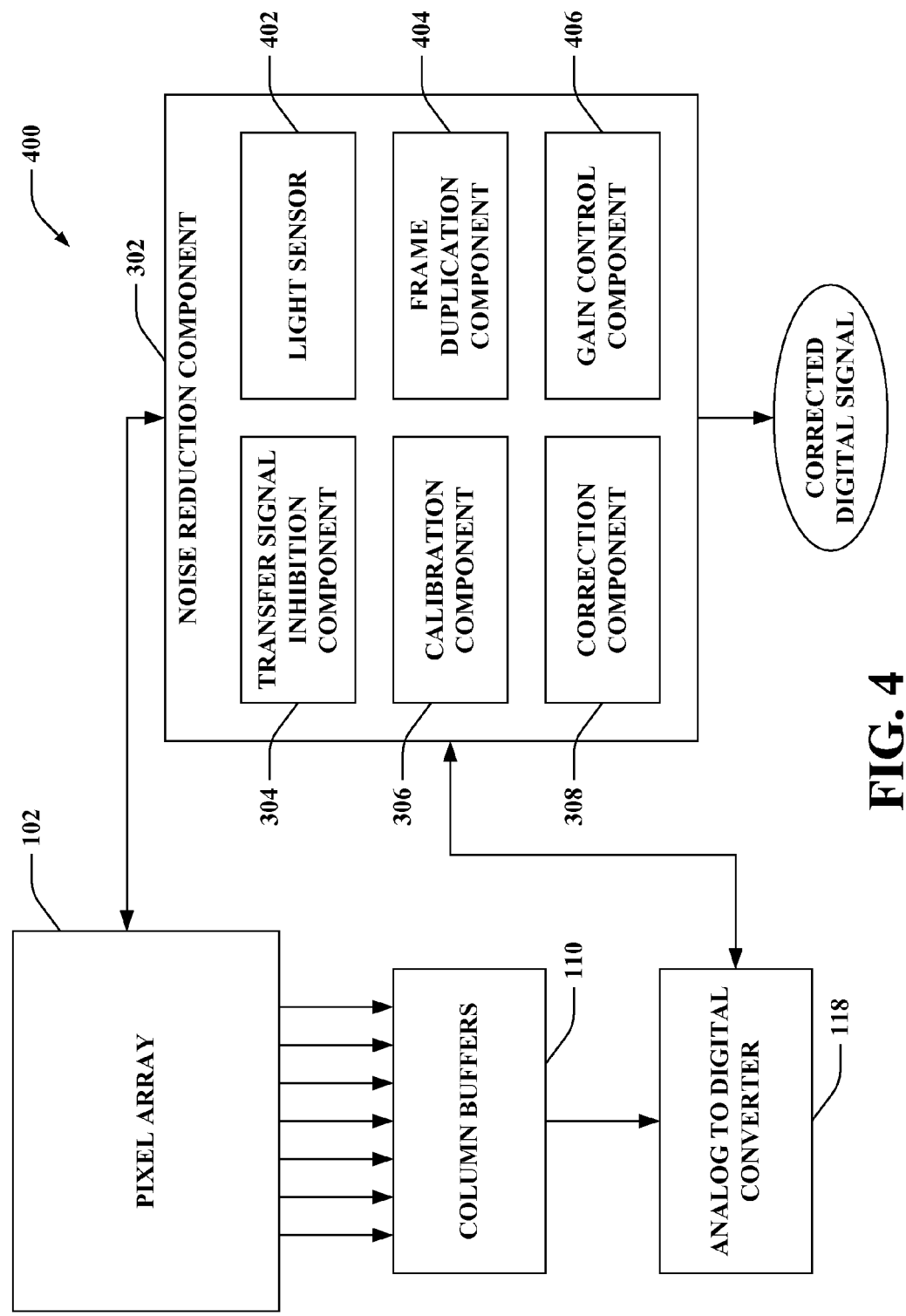
FIG. 4 illustrates an example system that employs a uniform frame rate for a CMOS sensor imager while adapting to differing light levels.

With reference to FIG. 4, illustrated is a system 400 that employs a uniform frame rate for a CMOS sensor imager while adapting to differing light levels. The system 400 can include the pixel array 102, the column buffers 110, the ADC 118 and the noise reduction component 302 as described above. Further, the noise reduction component 302 can include the transfer signal inhibition component 304, the calibration component 306, and the correction component 308. Moreover, the noise reduction component 302 can include a light sensor 402, a frame duplication component 404, and a gain control component 406 which can enable maintaining a consistent frame rate while under low light conditions.

The light sensor 402 can detect a light level associated with the pixel array 102. Although depicted as being included in the noise reduction component 302 (e.g., separate from the pixel array 102), it is contemplated that the light sensor 402 can additionally or alternatively be one or more pixels of the pixel array 102. Thus, feedback related to the light level can be obtained by the noise reduction component 302 from the pixel array 102 (e.g., directly, via the ADC 118, . . . ).

The light sensor 402 (and/or the noise reduction component 302) can evaluate the identified light level (e.g., compare the light level to a threshold). When the detected light level is below the threshold (e.g., low light conditions), accuracy, timing, etc. associated with a CMOS sensor imager can be impacted due to difficulty associated with collecting light. Accordingly, artifacts can be more prevalent due at least in part to pixel or column fixed pattern noise when the light levels are low. Moreover, it is to be appreciated that the detected light level can be compared to more than one threshold.

When the light level is recognized as being below the threshold, the transfer signal inhibition component 304 can send command(s) to prevent firing transfer signals within the pixel array 102 for a subset of time periods. During these time periods of the subset, photodiodes of the pixels in the pixel array 102 can continue to integrate incident light; thus, blocking the transfer signals can extend an amount of time that each photodiode integrates the light while under low light conditions, which causes stronger signals to be yielded from the pixels in low light. Moreover, the calibration component 306 can utilize signals obtained from pixels with blocked transfer signals to calibrate for pixel or column fixed pattern noise, while the remainder of the signals from clear pixels with unblocked transfer signals can be adjusted by the correction component 308 to mitigate pixel or column fixed pattern noise as described herein.

According to an example, the transfer signal inhibition component 304 can transfer command(s) to block firing of transfer signals for a frame of data obtained by the pixel array 102. Thus, this frame of data (e.g., calibration frame, black frame, . . . ) can be utilized by the calibration component 306. Moreover, the frame duplication component 404 can copy data from a previous frame (e.g., frame not utilized for calibration) for inclusion in an output signal. For instance, the frame duplication component 404 can replicate the data frame obtained immediately prior to sending the command(s) to block transfer signal firing. The frame duplication component 404 can replace the calibration frame with the replicated frame as part of the outputted signal (e.g., corrected digital signal) yielded by the noise reduction component 302. Hence, the replicated frame can be adjusted by the correction component 308 to mitigate pixel or column fixed pattern noise, for example.

Moreover, it is contemplated any number, frequency, and so forth of calibration frames can be replaced with duplicated data frames by the frame duplication component 404. The rate of calibration frame receipt can be controlled as a function of sensed light level. Pursuant to an example, the noise reduction component 302 can control the pixel array 102 such that every other frame received is a calibration frame (e.g., a first frame obtained by the noise reduction component 302 is a standard data frame, a second frame obtained by the noise reduction component 302 is a calibration frame, a third frame obtained by the noise reduction component 302 is a standard data frame, a fourth frame obtained by the noise reduction component 302 is a calibration frame, . . . ) under a low light scenario. Following the aforementioned example, the calibration component 306 can employ the calibration frames (e.g., the second obtained frame and the fourth obtained frame). Moreover, the frame duplication component 404 can copy the standard data frames respectively obtained immediately prior to each calibration frame. The frame duplication component 404 can replace the calibration frames with the corresponding copied standard data frames in the output generated by the noise reduction component 302. Accordingly, the frame rate associated with the output of the noise reduction component 302 can remain consistent whether or not control of the pixel array 102 yields sacrificed frame(s) for calibration purposes.

The gain control component 406 can amplify and/or deamplify digital signals obtained from the ADC 118. For instance, the gain control component 406 can apply a digital gain of −6 dB to digital signals associated with a standard data frame obtained immediately after a calibration frame. Such gain can diminish increased (e.g., doubled) signals that result from increased (e.g., doubled) lengths of time for light integration occurring at photodiodes of pixels in the pixel array 102 while the transfer signals are blocked (e.g., associated with the calibration frame); thus, linear reduction of the signals can be provided without changing the integration time (e.g., rather, the gain is being altered). For instance, twice as much time (e.g., ~32 ms versus ~16 ms) can be utilized for light integration during low light conditions (e.g., when the transfer signals are blocked in the pixel array 102) as compared to non-low light conditions; thus, the signal outputted by the pixels can be doubled. Moreover, the gain control component 406 can increase a gain level for a second frame occurring after the calibration frame (e.g., the second frame occurring after the calibration frame can itself be a calibration frame, a standard data frame, . . . ); hence, a digital gain of +6 dB can be applied to the second frame received after the calibration frame to return the gain for the previous level.

Figure 5:
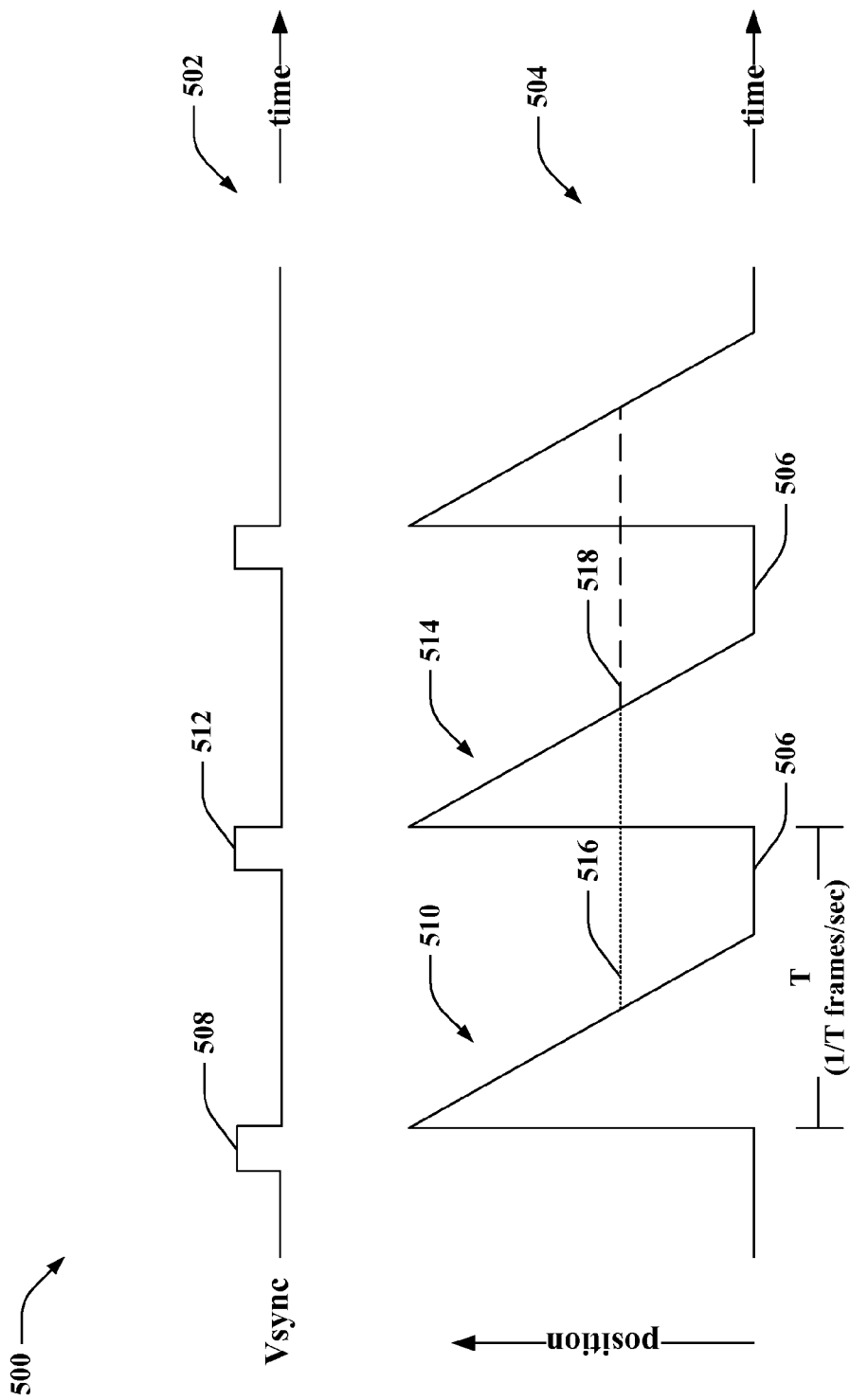
FIG. 5 illustrates an example timing diagram associated with a CMOS sensor imager that utilizes a rolling shutter.

Turning to FIG. 5, illustrated is an example timing diagram 500 associated with a CMOS sensor imager that utilizes a rolling shutter. Vertical synchronization (Vsync) 502 can be utilized to synchronize frame readout. Upon providing a Vsync signal, readout can begin for each frame. Readout can be effectuated from a top position to a bottom position within a pixel array (e.g., the pixel array 102 of FIG. 1) over time as depicted in graph 504 for each frame. Each line within the pixel array can be associated with a given time. After readout of the pixels, a blanking interval 506 can occur prior to readout of a next frame.

For example, a first Vsync signal 508 can cause readout associated with a first frame 510. After the blanking interval 506 of the first frame 510, a second Vsync signal 512 can be provided, which can initiate readout of a second frame 514. Each frame 510, 514 can have a period of T (e.g., T can be ~16 ms); thus, the frame rate can be $$\frac{1}{T}$$

frames per second (e.g., 60 frames per second). Accordingly, the amount of time for integration of light at a photodiode of a pixel can be equal to T (as shown by dotted line 516).

A subset of the frames 510, 514 can be utilized for calibration (e.g., during low light conditions). Accordingly, the amount of time for light integration can be increased to 2T (e.g., combination of dotted lines 516 and 518 for a particular pixel) for at least a portion of the frames (e.g., while under low light conditions).

Prior to each Vsync signal 508, 512, a command (e.g., SPI command) can be sent to a generator (not shown) that yields transfer signals for gates of the pixels. A subset of the commands can block transfer signals. According to an example, the command sent just prior to the first Vsync signal 508 can block the transfer signals associated with the first frame 510. Thus, the first frame 510 can be utilized for calibration (e.g., instead of only row(s) of optical black pixels) in connection with a pixel or column fixed pattern noise algorithm. Since the transfer signals are blocked from the gates of the transfer transistors of the pixels in the array, each pixel in the frame 510 can continue to integrate light at a respective photodiode (e.g., charges at the photodiodes are not transferred to corresponding floating diffusion regions). Moreover, the voltage at the floating diffusions regions can still be read even though such voltages lack correlation to the charges at the photodiodes. These sampled voltages can be utilized as references to evaluate pixel or column fixed pattern noise. Further, following this example, the command sent just prior to the second Vsync signal 512 can unblock the transfer signals. Therefore, the charges obtained at the photodiodes can be transferred to the floating diffusions regions and thereafter readout in connection with the second frame 514.

Figure 6:
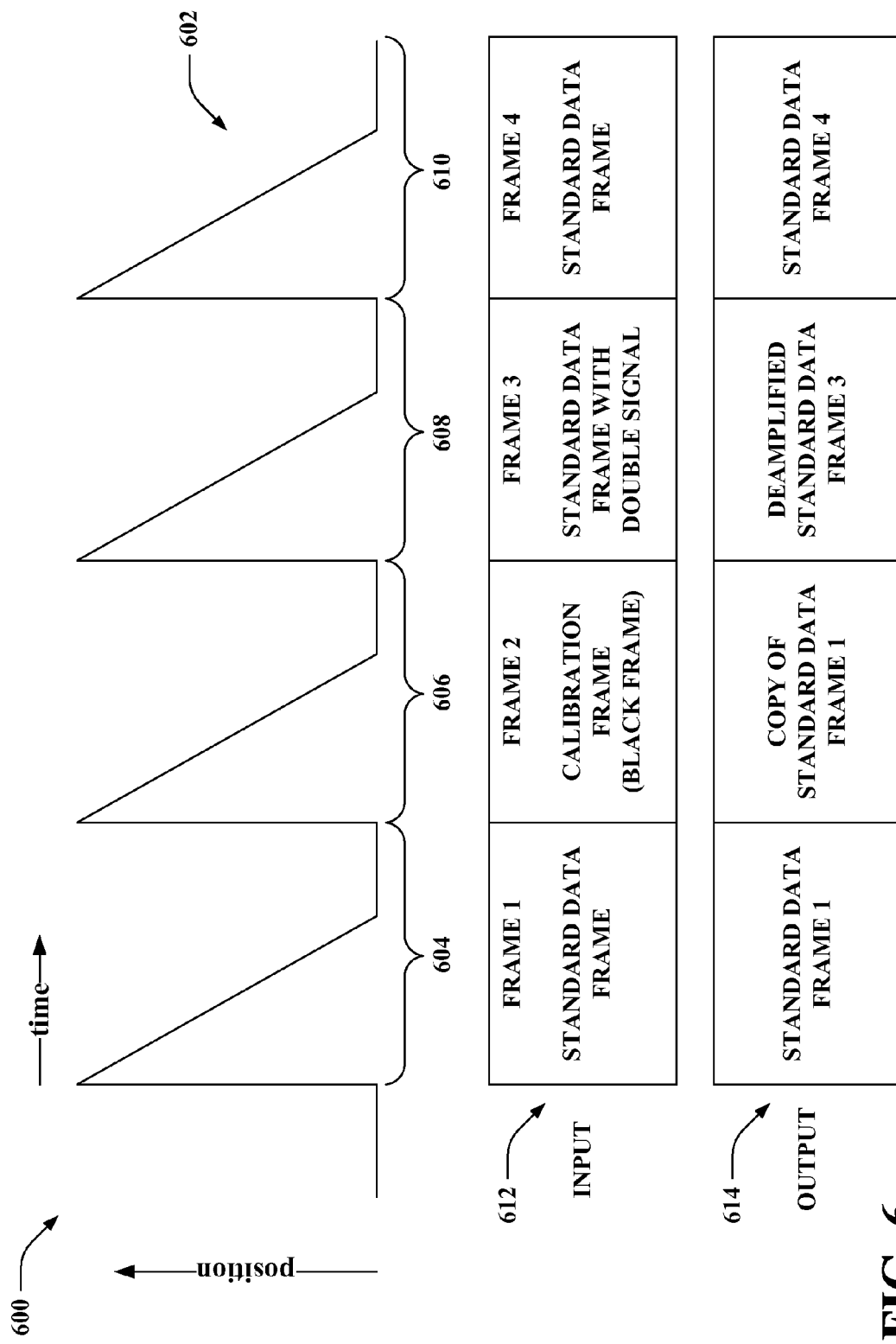
FIG. 6 illustrates another example timing diagram associated with a CMOS sensor imager.

Now referring to FIG. 6, illustrated is another example timing diagram 600 associated with a CMOS sensor imager. Graph 602 (e.g., similar to graph 504 of FIG. 5) depicts readout position within a pixel array over time for a plurality of frames. Graph 602 includes four frames 604, 606, 608, and 610 that can be read out from the pixel array; however, the claimed subject matter is not so limited. Moreover, a sequence of input frames 612 (e.g., frames yielded by the ADC 118 and inputted to the noise reduction component 302 of FIG. 4) and a sequence of output frames 614 (e.g., frames generated as output from the noise reduction component 302) are depicted.

Pursuant to an example, signals associated with the first frame 604 can be read out, digitized, and so forth. The corresponding digital signals can be inputted to the noise reduction component 302 as a standard data frame (e.g., standard data frame 1). The standard data frame can include signals that correspond to incident light converted to electrical signals at pixels of the pixel array (e.g., rather than signals that lack correspondence to the incident light). Moreover, the output generated by the noise reduction component 302 can be the standard data frame 1, which can, but need not, be corrected to mitigate pixel or column fixed pattern noise.

Further, prior to the frame 606, a command (e.g., SPI command) can be sent to block transfer signals associated with the frame 606. Thus, the input associated with the frame 606 can be a calibration frame (e.g., black frame that includes signals that lack correlation to incident light at the pixel array). Accordingly, the calibration component 306 can leverage data included in the calibration frame to determine, calculate, alter, refine, etc. pixel fixed pattern noise values. Moreover, the output from the noise reduction component 302 associated with the frame 606 can be a copy of the standard data frame 1 (e.g., duplicate of the previous frame yielded by the frame duplication component 404), which can be corrected to account for pixel or column fixed pattern noise. Accordingly, a uniform outputted frame rate can be provided by copying data associated with the standard data frame 1 rather than sacrificing outputs related to the calibration frame without such duplication.

Additionally, a command (e.g., SPI command) can be transmitted before the frame 608 to unblock the transfer signals. Therefore, the charges obtained at the photodiodes can be transferred to the floating diffusions regions and thereafter readout in connection with the frame 608. However, since integration occurred at the photodiodes for an extended period of time (e.g., twice as long of a time period), a standard data frame with twice as much signal (e.g., signals multiplied by two) can be inputted. Deamplification of the signals associated with the standard data frame 3 can be effectuated by the gain control component 406. For example, digital gain of −6 dB can be applied, which can divide the signals associated with frame 3 in half (e.g., linear reduction of the signals). Hence, the output corresponding to frame 608 can be the standard data frame 3 which has been deamplified. Moreover, calibration can be effectuated by employing data from optical black pixel(s) associated with the frame 608; however, such calibration need not be performed.

Further, before frame 610, a disparate command (e.g., SPI command) can be applied. The command prior to the frame 610 can block the transfer signals or enable the transfer signals to continue to be unblocked. The depicted example illustrates that the transfer signals are unblocked for the frame 610, and thus, the input is a standard data frame. Digital gain can be applied to compensate for the gain provided during the previous frame (e.g., adjust for the deamplification of the signals associated with the standard data frame 3); therefore, +6 dB of digital can be applied, for instance. Moreover, the output related to the frame 610 can be the standard data frame 4, which can be corrected to mitigate the pixel or column fixed pattern noise. According to another example, the command sent prior to the frame 610 can block the transfer signals, and therefore, the input frame associated therewith can be a calibration frame similar to the calibration frame related to the frame 606, while the output can be a copy of the output associated with the frame 608.

By way of illustration, readout from the pixel array can be at 60p (e.g., 60 frames per second in a progressive scan manner). In a low light scenario, the inputted rate associated with data frames can be reduced (e.g., to 30p) since calibration frames can be included. However, the 60p rate associated with the output can continue to be employed by copying frames as described herein. It is to be appreciated, however, that the claimed subject matter is not limited to this example since any data rates (e.g., progressive, interlaced, . . . ) can be utilized.

Figure 7:
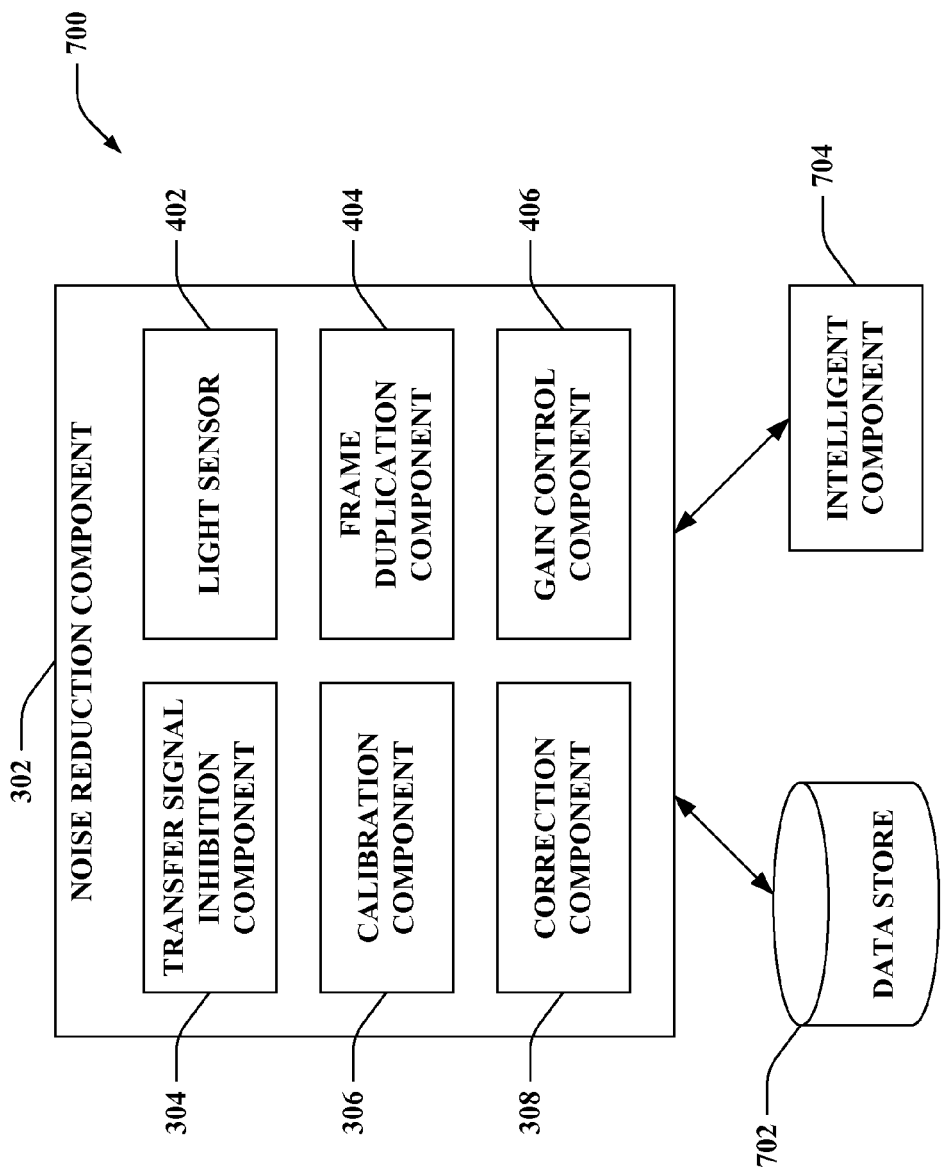
FIG. 7 illustrates an example system that compensates for pixel fixed pattern noise while maintaining a constant frame rate within a CMOS sensor imager.

Referring now to FIG. 7, illustrated is a system 700 that compensates for pixel or column fixed pattern noise while maintaining a constant frame rate within a CMOS sensor imager. The system 700 includes the noise reduction component 302, which can further comprise the transfer signal inhibition component 304, the calibration component 306, the correction component 308, the light sensor 402, the frame duplication component 404, and/or the gain control component 406, each of which can be substantially similar to the aforementioned descriptions. The noise reduction component 302 can further be coupled to a data store 702 and/or an intelligent component 704.

The data store 702 can retain data related to calibration (e.g., trending data, historical data, . . . ). For instance, the data store 702 can include a frame of memory that can map to noise values corresponding to pixels of a pixel array as determined by the calibration component 306 during a calibration mode. Moreover, the noise values can be retrieved from the data store 702 and leveraged by the correction component 308 to mitigate pixel fixed pattern noise. Further, the data store 702 can retain frames of digital signals, which can be retrieved and employed by the frame duplication component 404 to provide outputted data at a consistent frame rate. The data store 702 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 702 of the subject systems and methods is intended to comprise, without being limited to, these and any other suitable types of memory. In addition, it is to be appreciated that the data store 702 can be a server, a database, a hard drive, and the like.

Further, the intelligent component 704 can be employed by the noise reduction component 302 (and/or the calibration component 306) to reason about whether to effectuate calibration (e.g., based upon changed conditions, parameters, . . . ). Pursuant to another example, the intelligent component 704 can infer an amount of fixed pattern noise yielded in digital signals outputted by the noise reduction component 302; thus, in response to the inferred level of fixed pattern noise, recalibration can be initiated by the calibration component 306, variations in operation of the correction component 308 can be effectuated, a threshold indicative of a low light condition (e.g., recognized by the light sensor 402) can be adjusted, and so forth.

It is to be understood that the intelligent component 704 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
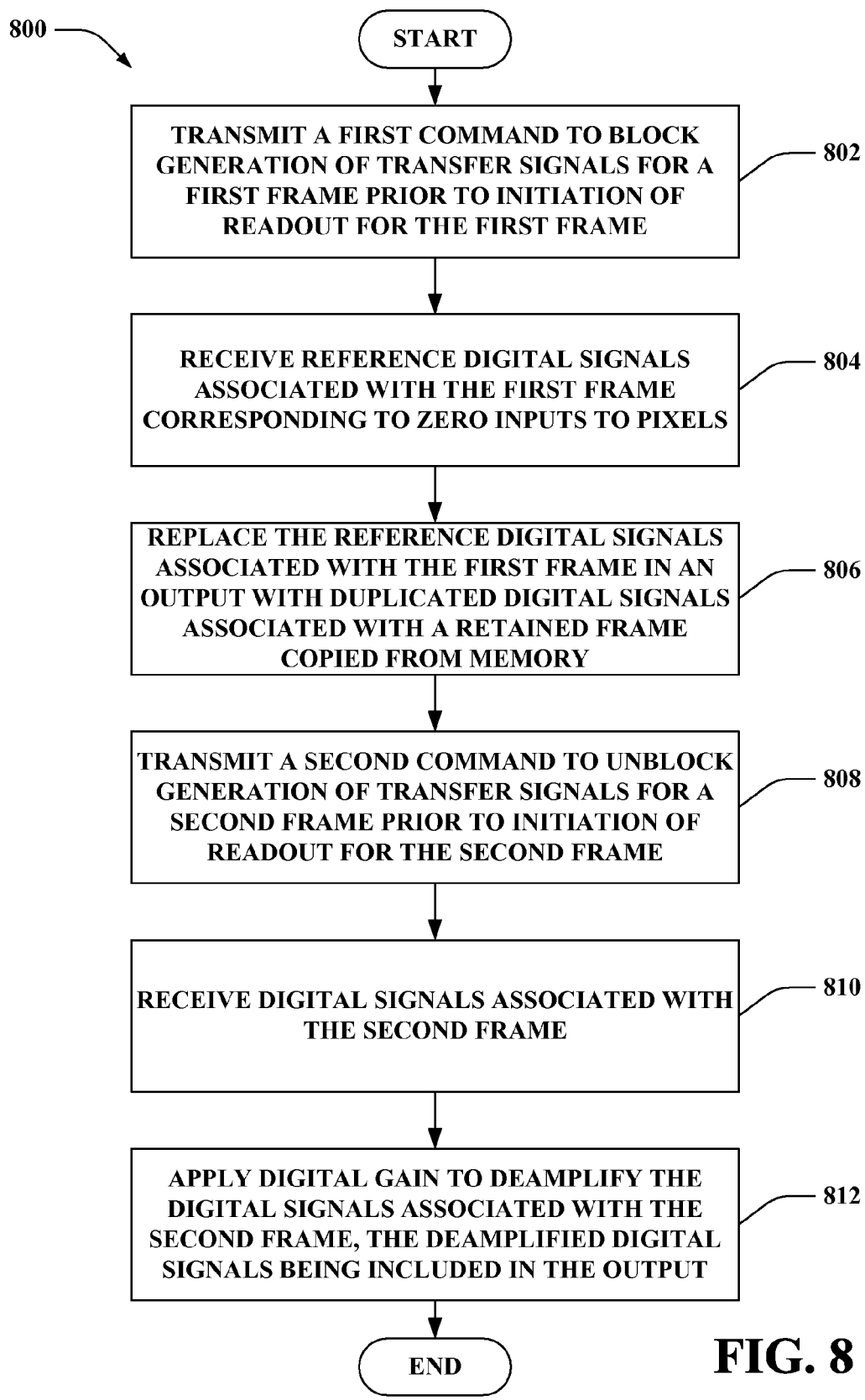
FIG. 8 illustrates an example methodology that facilitates maintaining uniform outputted frame rates in a CMOS sensor imager while obtaining reference frames for calibration.
Figure 9:
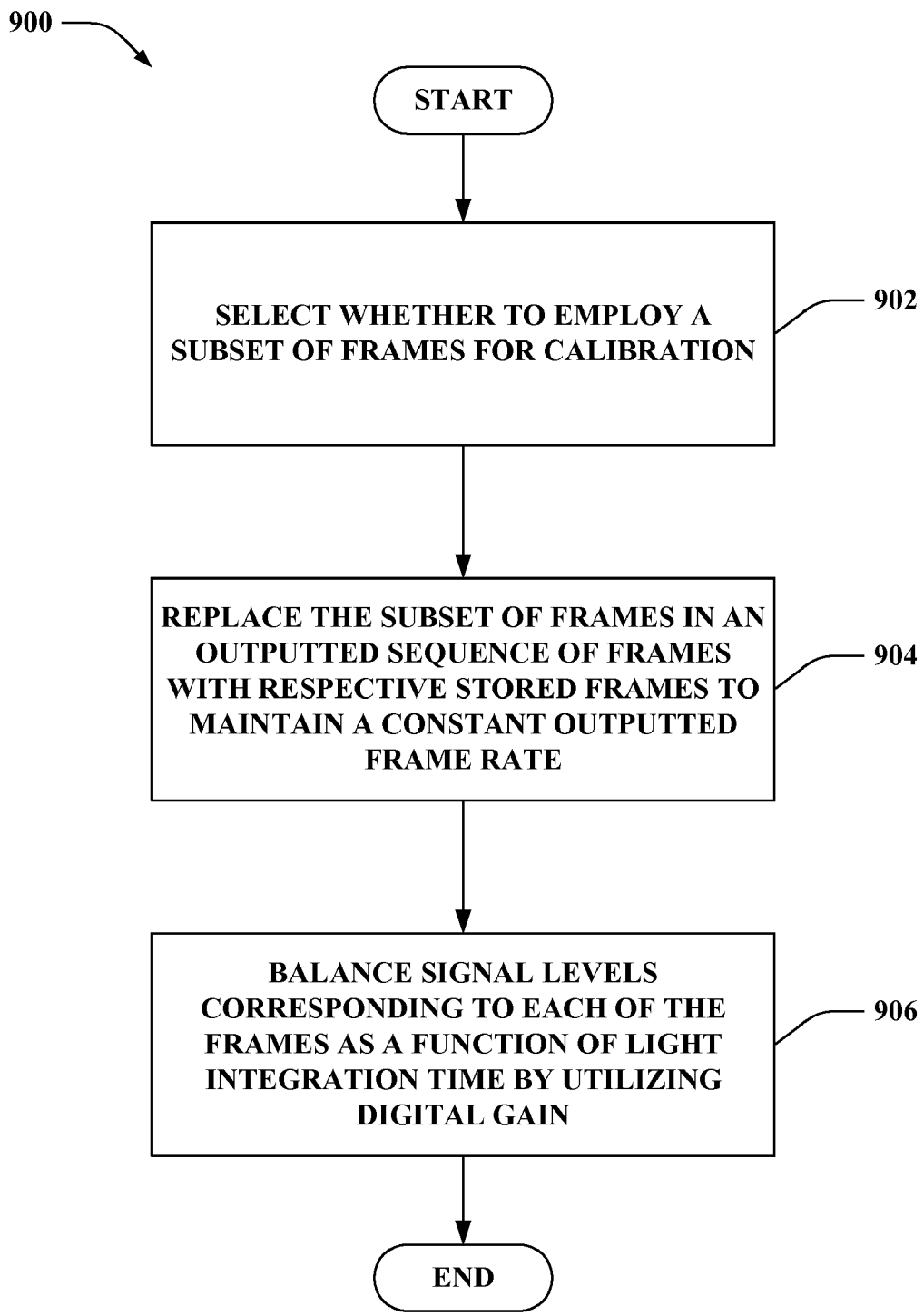
FIG. 9 illustrates an example methodology that facilitates calibrating for fixed pattern noise in a CMOS sensor imager.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates maintaining uniform outputted frame rates in a CMOS sensor imager while obtaining reference frames for calibration. At 802, a first command can be transmitted to block generation of transfer signals for a first frame prior to initiation of readout for the first frame. The transfer signals can typically be provided to gates of transfer transistors included in pixels; thus, inhibiting the transfer signals can prevent charges collected at photodiodes from being transferred to floating diffusion regions in the pixels. While the charge transfer is blocked, the photodiode can continue to integrate light. Moreover, the first command can be a SPI command. Further, the first command can be transferred prior to a first vertical synchronization signal that coordinated readout for the first frame. At 804, reference digital signals associated with the first frame corresponding to zero inputs can be received. The pixels can obtain zero inputs when the transfer signals are blocked since the charges collected at photodiodes of the pixels can be inhibited from being transferred to respective floating diffusion regions. Fixed pattern noise values for each of the pixels can be determined based at least in part upon the reference digital signals from the first frame. Moreover, reference digital signals from differing frame(s) can be employed to yield the fixed pattern noise values. Additionally, reference digital signals from optical black pixels can be evaluated for determining at least a subset of the fixed pattern noise values. It is contemplated that any fixed pattern noise algorithm can be utilized to yield the fixed pattern noise values (e.g., reference digital signals can be averaged, aged out, medians and/or modes can be utilized, . . . ). The fixed pattern noise values, for example, can be retained in memory. At 806, the reference digital signals associated with the first frame can be replaced in an output with duplicated digital signals associated with a retained frame copied from memory. For instance, digitals signals associated with a frame received immediately prior to the first frame can be stored in memory; however, the claimed subject matter is not so limited. Accordingly, this retained frame can be utilized to replace the reference frame employed for calibration in the digital output.

At 808, a second command can be transmitted to unblock generation of transfer signals for a second frame prior to initiation of readout for the second frame. The second command can be a SPI command and/or can be transferred prior to a second vertical synchronization signal that coordinated readout for the second frame. Moreover, by unblocking the transfer signals, charges obtained at photodiodes can be transferred to floating diffusion regions of the pixels, and these charges can thereafter be sampled. At 810, digital signals associated with the second frame can be received. The digital signals can correspond to sampled outputs from the pixels. At 812, digital gain can be applied to deamplify the digital signals associated with the second frame, where the deamplified digital signals can be included in the output. For example, digital gain of −6 dB can be applied to divide the digital signals associated with the second frame in half (e.g., these digital signals can be twice as large due to employing twice the length of time for light integration at the photodiodes). The output corresponding to the first and second read out frames can accordingly include the duplicated frame and the deamplified second frame, respectively. Moreover, the digital signals associated with the duplicated frame and/or the deamplified second frame can be corrected based upon the fixed pattern noise values for each of the pixels (e.g., determined at least in part from the reference digital signals). Further, a digital gain of +6 dB can be applied to digital signals associated with a disparate frame subsequent to the second frame.

Now turning to FIG. 9, illustrated is a methodology 900 that facilitates calibrating for fixed or column pattern noise in a CMOS sensor imager. At 902, a selection can be effectuated concerning whether to employ a subset of frames for calibration. For instance, the selection can be based upon a user input, a sensed input (e.g., light level, temperature change, . . . ), and so forth. At 904, when calibration is selected, the subset of frames can be replaced in an outputted sequence of frames with respective stored frames to maintain a constant outputted frame rate. By way of illustration, a respective frame read out immediately prior to each frame in the subset can be duplicated and incorporated into the outputted sequence of frames (e.g., replacing the frames in the subset). According to another example, the outputted frame rate can remain at 60 frames per second (e.g., 60p, 60i, . . . ) regardless whether the subset of frames are utilized for calibration; however, it is to be appreciated that the claimed subject matter is not limited to this example as any frame rates can be supported. At 906, signal levels corresponding to each of the frames can be balanced as a function of light integration time by utilizing digital gain. For instance, frames with longer integration times can be deamplified.

Figure 10:
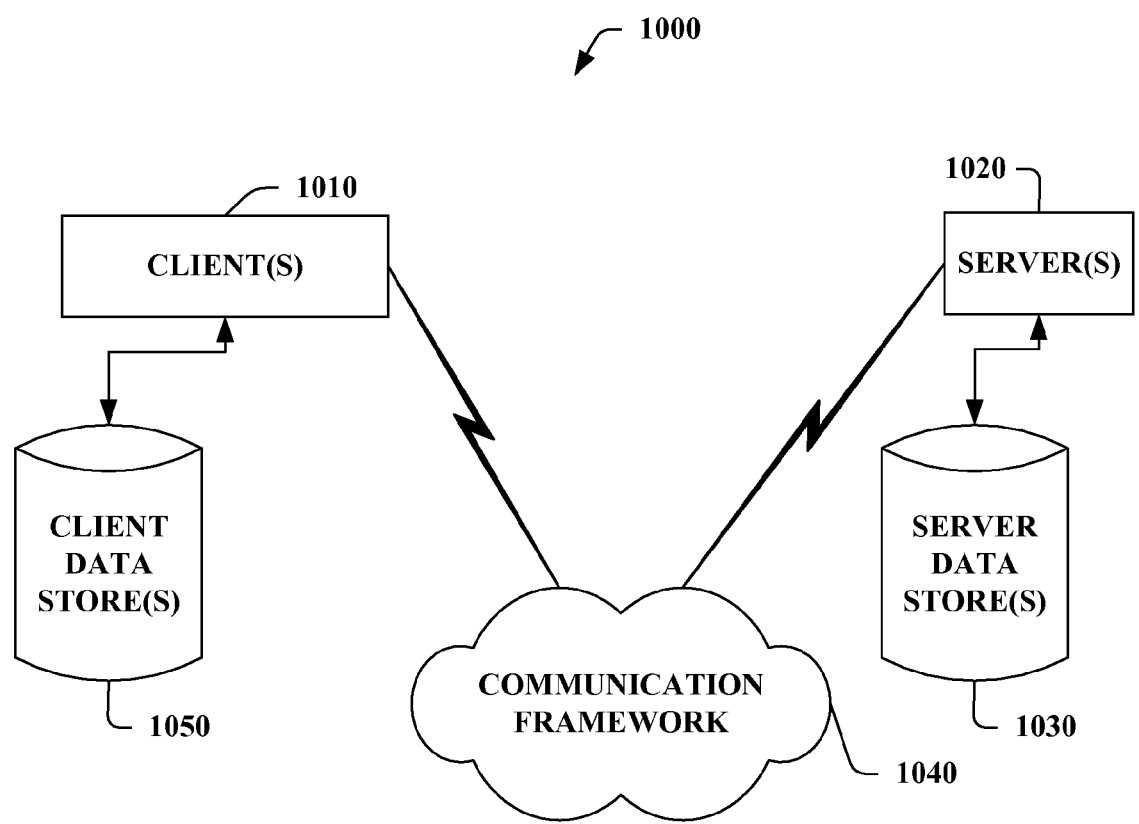
FIG. 10 illustrates an example networking environment, wherein the novel aspects of the claimed subject matter can be employed.
Figure 11:
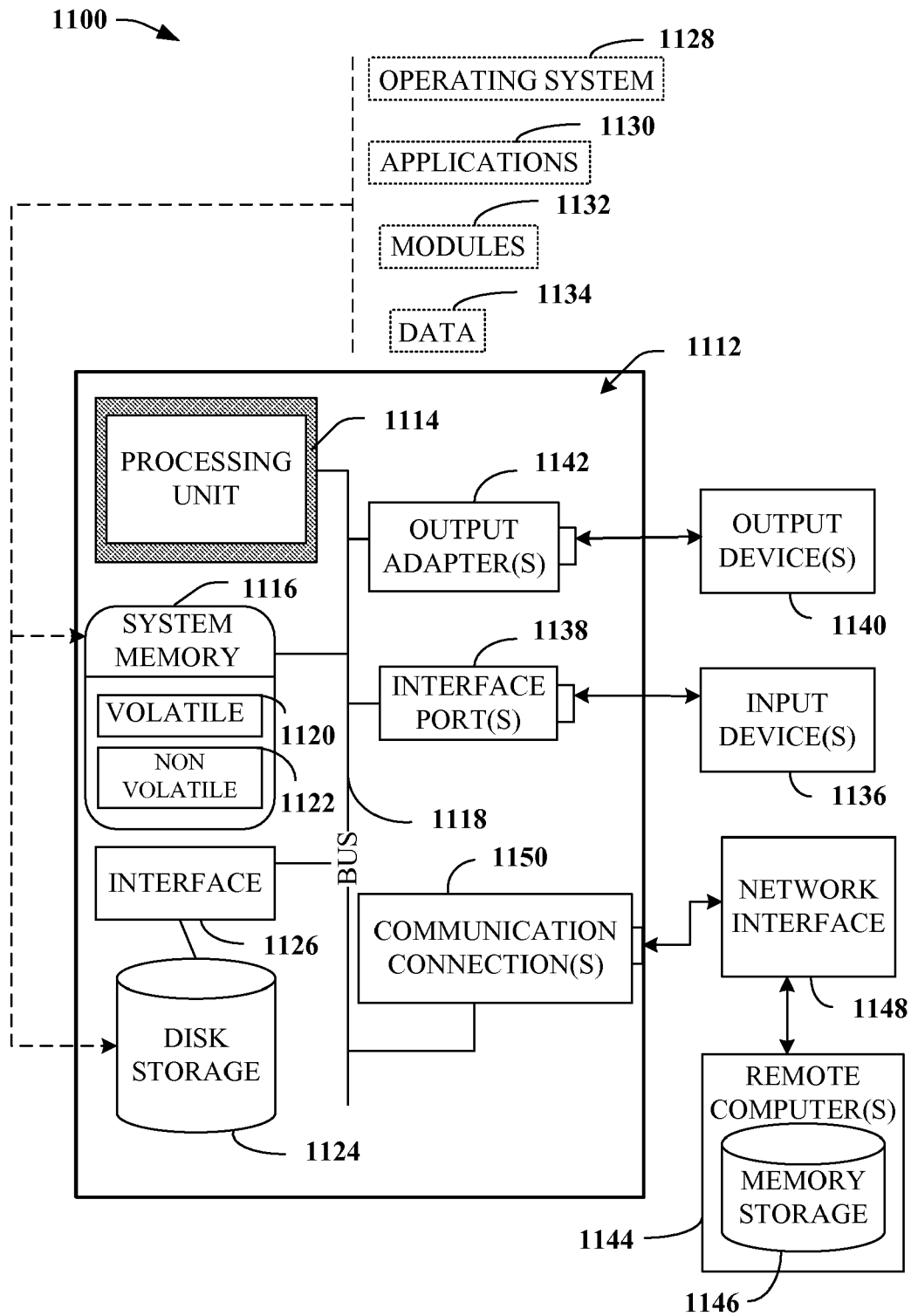
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with mitigating pixel fixed pattern noise within CMOS sensor imagers. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A complementary metal-oxide-semiconductor imaging system-on-chip sensor including a system thereon that maintains a substantially uniform frame rate, comprising:
  a transfer signal inhibition component configured to transmit, for a selected frame of a pixel array sampled during a calibration mode, a first command to block triggering of transfer signals to gates of transfer transistors of pixels in the pixel array while sampling signals in the pixel array for the selected frame to generate a calibration frame, and to transmit a second command to unblock triggering of the transfer signal for a first subsequent frame relative to the selected frame;
  a frame duplication component configured to replicate a data frame obtained prior to transmission of the first command and replace the calibration frame in an outputted sequence of frames with the data frame; and
  a gain control component configured to apply a negative digital gain to digital signals associated with the first subsequent frame, and to apply a positive digital gain to digital signals associated with a second subsequent frame following the first subsequent frame, wherein the negative digital gain and the positive digital gain are substantially equal in magnitude.

2. The sensor of claim 1, further comprising a calibration component configured to determine a fixed pattern noise value associated with at least one of the pixels based at least in part upon a digital signal associated with the calibration frame.

3. The sensor of claim 1, wherein the gain control component is configured to apply the negative digital gain and the positive digital gain as a function of an amount of time for light integration at photodiodes of the pixels in the pixel array.

4. The sensor of claim 1, wherein the negative digital gain is −6 decibels (dB) or approximately −6 dB, and the positive digital gain is +6 dB or approximately +6 dB.

5. The sensor of claim 1, wherein the first command precludes transfer of charges from photodiodes to floating diffusion regions of the pixels, the charges being obtained by integrating light at the photodiodes.

6. The sensor of claim 1, further comprising a light sensor configured to detect a light level associated with the pixel array and initiate transmission of the first command and generation of the calibration frame in response to a determination that the light level is below a threshold.

7. The sensor of claim 1, wherein the data frame obtained prior to transmission of the first command is a frame immediately prior to the calibration frame in a sequence of read out frames.

8. The sensor of claim 1, further comprising a noise reduction component configured to yield the outputted sequence of frames with a substantially consistent frame rate for a range of frequencies of calibration frame generation.

9. The sensor of claim 1, wherein a rate of generation of calibration frames is controlled as a function of a sensed light level.

10. The sensor of claim 1, further comprising a correction component configured to utilize fixed pattern noise values associated with pixels calibrated based at least in part on the calibration frame to mitigate pixel fixed pattern noise in the outputted sequence of frames.

11. A method that facilitates maintaining substantially uniform outputted frame rates in a sensor imager while obtaining reference frames for calibration, comprising:
  initiating a calibration mode for a selected first frame;
  executing, in response to the initiating, a first command to block generation of transfer signals to transfer transistors of pixels for the selected first frame prior to initiation of readout for the first frame;
  receiving reference digital signals associated with the selected first frame while the transfer signals are blocked;
  replacing the reference digital signals associated with the selected first frame in an output with duplicated digital signals associated with a retained frame copied from memory;
  executing a second command to unblock generation of the transfer signals for a second frame prior to initiation of readout for the second frame;
  receiving digital signals associated with the second frame;
  applying negative digital gain to deamplify the digital signals associated with the second frame to yield deamplified digital signals, the deamplified digital signals being included in the output; and
  applying positive digital gain to digital signals associated with a third frame immediately following the second frame, wherein a magnitude of the negative digital gain is substantially equal to a magnitude of the positive digital gain.

12. The method of claim 11, further comprising determining fixed pattern noise values for the pixels based at least in part upon the reference digital signals from the selected first frame.

13. The method of claim 12, further comprising correcting the output based upon the fixed pattern noise values for the pixels.

14. The method of claim 11, further comprising configuring the executing the first command and the receiving the reference digital signals to occur for multiple data frames of the output at a selected frequency.

15. The method of claim 14, further comprising maintaining a substantially consistent frame rate for the output over multiple values of the selected frequency.

16. The method of claim 15, further comprising controlling a rate of the transmitting the first command and the receiving the reference digital signals as a function of a sensed light level.

17. A system that enables calibrating for pixel fixed pattern noise in a sensor imager, comprising:
  means for selecting a calibration frame;
  means for executing a first command to block generation of transfer signals to gates of transfer transistors of pixels in a pixel array while sampling signals in the pixel array for the calibration frame and a second command to unblock generation of the transfer signals for a subsequent frame relative to the calibration frame;
  means for replacing the calibration frame in an outputted sequence of frames with a stored frame to maintain a substantially constant outputted frame rate; and
  means for applying a negative digital gain to a first signal level of the subsequent frame and applying a positive digital gain to a second signal level of a next frame immediately following the subsequent frame, wherein the negative digital gain and the positive digital gain have substantially equal magnitudes.

* * * * *